Patented Nov. 13, 1951

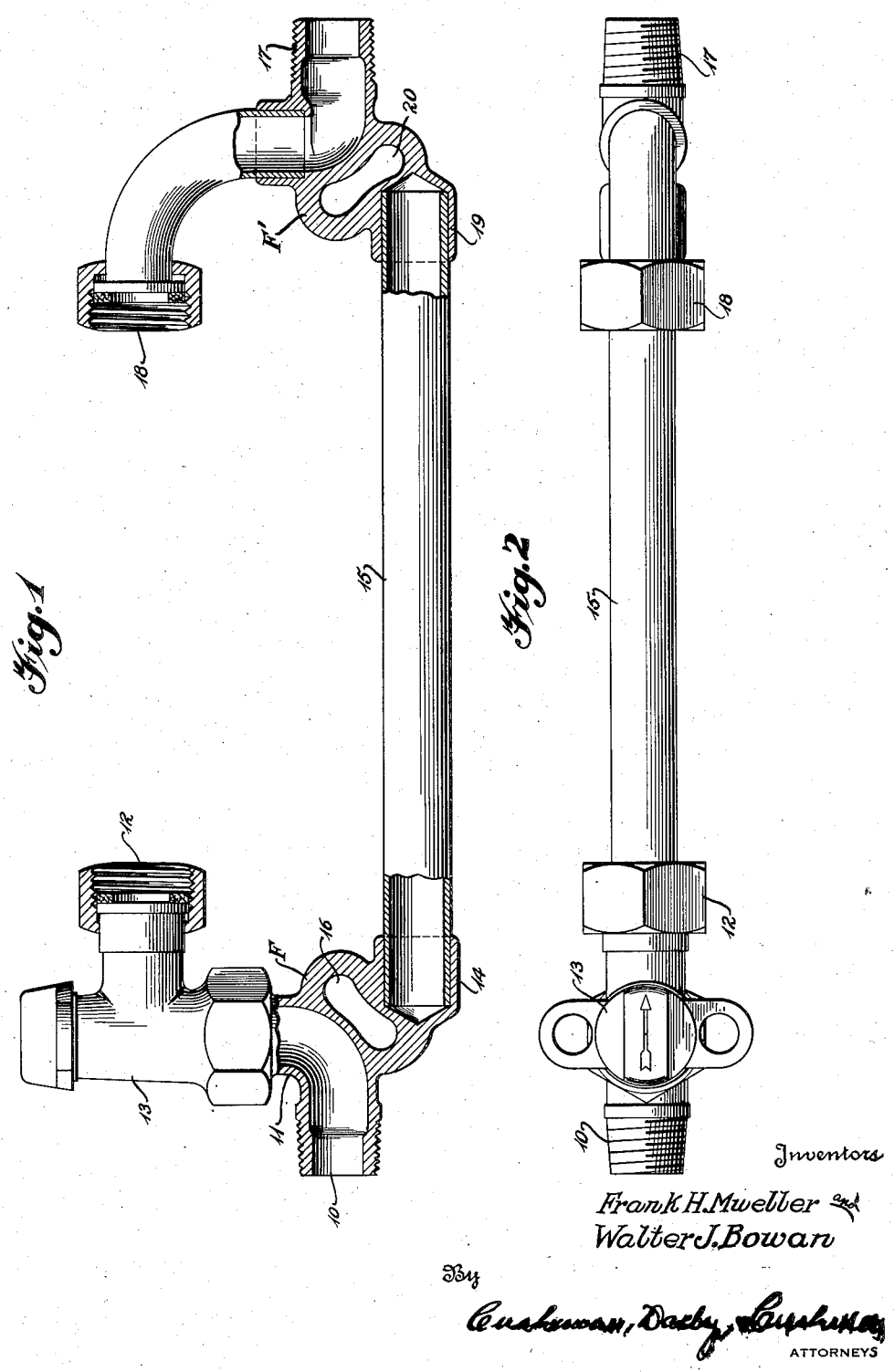

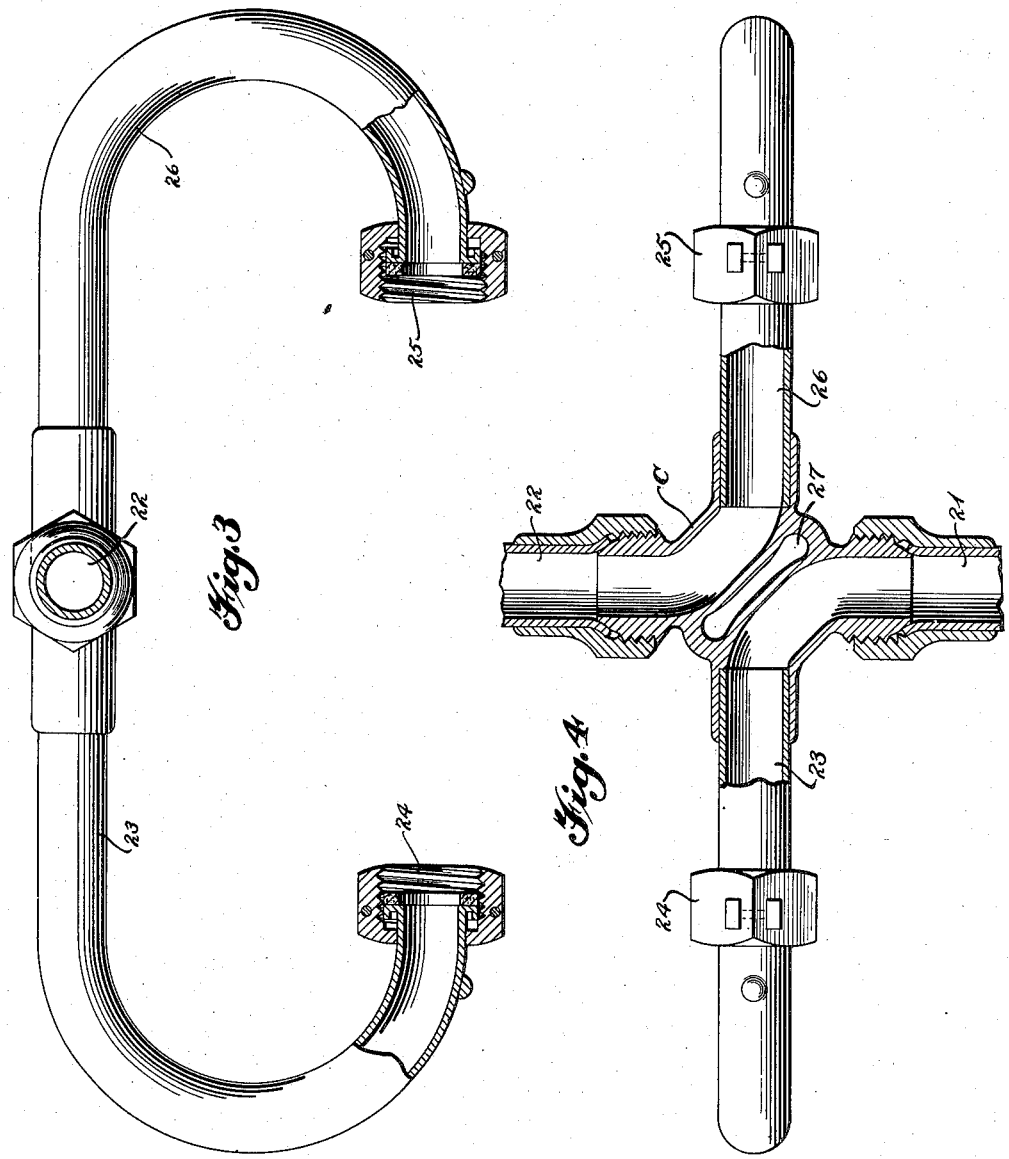

2,574,982

UNITED STATES PATENT OFFICE 2,574,982

LIQUID METER YOKE

Frank H. Mueller and Walter J. Bowan, Decatur, Ill., assignors to Mueller Co., Decatur, Ill., a corporation of Illinois Application March 15, 1949, Serial No. 81,492

1 Claim. (Cl. 285—3)

The present invention has to do with meter yokes for liquid meters. Yokes of this type are utilized for setting meters for distributing fluids from mains or supply lines to house or service pipes in metered volume. It is essential that such yokes be so designed as to be compact in structure not only to permit installations in restricted spaces, such, for example, as houses without basements or cellars, but also to conserve metal. Generally these yokes are made of brass, a costly metal, which must be reduced in amount as much as possible in order to keep the cost of production at a minimum.

It is one of the objects of the present invention to meet the needs outlined above.

Another prime object of the invention is to prevent by-passing the meter so as to deliver fluid from the supply main to the house pipe without routing it through the meter. In some fittings this by-passing has been accomplished by drilling through the fitting so as to provide a passage direct from the supply inlet from the main to the outlet to the house pipe. This unscrupulous practice has often resulted in considerable trouble and meters open to this tampering have been rejected by distributors of fluid supplies, such, for example, as water or gas companies, and more expensive and complicated installations have been adopted.

The present development provides a fitting in which the matter of installation in small or restricted spaces is rendered easy. The fitting can be manufactured with a minimum amount of material and a construction provided by which by-passing of the meter is prevented.

In the drawings herewith two embodiments of the invention are disclosed, and in said drawings:

Figure 1 is a view in side elevation of a meter yoke showing the invention.

Figure 2 is a plan view of the yoke shown in Figure 1.

Figure 3 is a plan view of another type of yoke embodying the invention.

Figure 4 is a view partly in section showing the make-up of the yoke.

Referring to the drawings, and first, of Figures 1 and 2, F and F¹ indicate fittings embodying the invention.

The fitting F is provided with an inlet 10 from the supply main and the outlet 11 to the meter connection 12. The meter (not shown) may be of any suitable type. A shut-off valve 13, such as is commonly used in connection with meters, is provided, to which the outlet 11 leads. The fitting F is provided with a socket 14 to receive one end of a pipe 15 which serves to couple the fittings F and F¹ together and properly space them relative to each other and the meter.

The fitting F will be provided with a chamber 16 open to atmosphere and disposed diagonally at the bend of the fitting and between the passage leading from the supply inlet 10 to the meter outlet 12. The opposite fitting F¹ is similarly constructed, having the inlet 17 leading to the house pipe which receives the fluid passing through the meter by way of the meter outlet 18. Fitting F¹ is provided with a socket 19 similar to the fitting F and between that socket 19 and the meter outlet passage leading to the house pipe 17 is an open chamber 20 formed in the body of the fitting and disposed diagonally, as shown.

Any attempt to by-pass the meter by drilling through the inlet fitting F to the pipe 15, and drilling the fitting F¹ leading to the house pipe outlet 17 and by so doing, by-pass the meter mounted between the meter inlet 12 and the meter outlet 18, is prevented by the chambers 16 and 20. These open chambers would, of course, prevent the fluid from passing directly from the main to the house pipe and it could not be delivered to the house pipe by by-passing the meter. The diagonal positioning of the chambers 16 and 20 is important and essential for the reason that the fitting can be made with a minimum amount of metal and in compact form so as to permit installation of the yoke and meter in limited spaces.

In the form of the invention shown in Figures 3 and 4, a meter yoke designed for use in setting a meter at a right angle to the service line is provided, which service line may be horizontal, vertical, or at an angle. Inlet and outlet connections are disposed in close relation for accessibility in small places and the meter can be properly spaced and the pipes in proper alignment.

In this form of the invention, a cross-shaped fitting C is provided, having an inlet 21 from the main and an outlet 22 from the meter, the inlet and outlet being preferably, as shown, in alignment with each other. From the inlet side of the fitting, pipe 23 is provided delivering to the meter through the connection 24 and from the meter the fluid flows to the connection 25 and the pipe 26 to the house or service pipe 22. Pipes 23 and 26 are coupled with the cross-shaped fitting C and are disposed in alignment and in substantially right angle relation to the inlet 21 and the outlet 22. The body of the fitting is provided between the inlet from the main and the outlet to the meter with a diagonally disposed open chamber 27 as shown in Figure 4, which chamber effectively prevents any by-passing of the meter between the meter outlet 24 and the house pipe 26 by drilling through the fitting at any point spanned by the diagonal chamber 27 so as to permit the fluid to pass directly to the outlet 22 of the fitting. As pointed out in connection with the disclosure in Figures 1 and 2, the diagonal position of this open chamber 27 is important as it permits a compact form of the cross-shaped fitting C, enabling it to be installed in a restricted space and reducing to a minimum the amount of metal used.

The advantages of placing this open chamber in diagonal relation to the inlets and outlets of the fitting cannot be too strongly emphasized. If such chamber was disposed vertically or horizontally with respect to the inlets and outlets and in parallel form with the vertical or horizontal passages of the fitting, it would be necessary to increase the size of the fitting to undue proportions in order that the open chamber would span the inlets and outlets. This would result not only in waste of costly metal but also sacrifice compactness in make-up. By this specific disposition of the chamber, as shown and described, a novel and effective fitting is provided.

We claim:

A fluid meter yoke comprising an elbow fitting having a fluid passage therethrough for the flow of fluid from a main to a meter, said fitting being provided with a pipe receiving socket; a second elbow fitting having a fluid passage therethrough for the flow of fluid from said meter to a service line, said second fitting being provided with a pipe receiving socket; and a socket engaging pipe connecting said fittings to space them from each other in proper relation to a meter, at least one of said elbow fittings being formed intermediate its fluid passage and its pipe receiving socket with a through chamber open only to the atmosphere and isolating said fluid passage and said pipe receiving socket from each other to facilitate the detection of unauthorized communication therebetween.

FRANK H. MUELLER.
WALTER J. BOWAN.

REFERENCES CITED

The following references are of record in the file of this patent:

UNITED STATES PATENTS

| Number | Name | Date |
| --- | --- | --- |
| 1,847,606 | Ford | Mar. 1, 1932 |
| 1,988,003 | Ford | Jan. 15, 1935 |
| 2,153,343 | Ruscher | Apr. 4, 1939 |
| 2,438,497 | Ford | Mar. 30, 1948 |